(12) United States Patent
Tauber et al.

(10) Patent No.: US 11,337,574 B2
(45) Date of Patent: May 24, 2022

(54) VACUUM APPARATUS HAVING A PLUG-IN MODULE

(71) Applicant: Robert Bosch GmbH, Stuttgart (DE)

(72) Inventors: Matthias Tauber, Duernau (DE); Tim Hartmann, Fellbach (DE); Joachim Schadow, Stuttgart (DE); Hans-Joachim Vogt, Stuttgart (DE); Kamil Pogorzelski, Stuttgart (DE); Joern Stock, Leinfelden-Echterdingen (DE); Philippe Van Den Bogaert, Korntal (DE); Micha Klingler, Leinfelden-Echterdingen (DE); Michael Wismer, Leinfelden-Echterdingen (DE); Klaus Dengler, Kornwestheim (DE); Frederic Hain, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 16/498,105

(22) PCT Filed: Jan. 31, 2018

(86) PCT No.: PCT/EP2018/052362
§ 371 (c)(1),
(2) Date: Sep. 26, 2019

(87) PCT Pub. No.: WO2018/177623
PCT Pub. Date: Oct. 4, 2018

(65) Prior Publication Data
US 2021/0100417 A1 Apr. 8, 2021

(30) Foreign Application Priority Data
Mar. 27, 2017 (DE) .................... 10 2017 205 072.1

(51) Int. Cl.
$A47L\ 9/28$ (2006.01)
$A47L\ 5/36$ (2006.01)
$A47L\ 7/00$ (2006.01)
$H02J\ 7/00$ (2006.01)

(52) U.S. Cl.
CPC ............ *A47L 9/2894* (2013.01); *A47L 5/365* (2013.01); *A47L 7/0095* (2013.01); *A47L 9/2842* (2013.01); *H02J 7/0068* (2013.01)

(58) Field of Classification Search
CPC ...... A47L 9/2894; A47L 5/365; A47L 7/0095; A47L 9/2842; A47L 9/2857;
(Continued)

(56) References Cited

U.S. PATENT DOCUMENTS

2009/0241283 A1* 10/2009 Loveless ............... A47L 9/2894
15/319
2016/0100724 A1* 4/2016 Valentini ............... G08C 17/02
134/18

FOREIGN PATENT DOCUMENTS

CN 1486797 A 4/2004
DE 10 2010 040 336 A1 3/2012
(Continued)

OTHER PUBLICATIONS

International Search Report corresponding to PCT Application No. PCT/EP2018/052362, dated May 14, 2018 (German and English language document) (7 pages).
(Continued)

*Primary Examiner* — Robert J Scruggs
(74) *Attorney, Agent, or Firm* — Maginot, Moore & Beck LLP

(57) ABSTRACT

The disclosure relates to a system, comprising a vacuum apparatus having a vacuum apparatus housing and having at least one vacuum apparatus mains socket, the at least one vacuum apparatus mains socket being attached to the
(Continued)

vacuum apparatus housing. According to the disclosure, the system additionally comprises a plug-in module, having a plug-in module communication unit, an electrical plug-in module mains plug unit, and a current control unit, which is designed to control an electrical current between the plug-in module and the vacuum apparatus.

17 Claims, 8 Drawing Sheets

(58) Field of Classification Search
CPC .. A47L 2201/00; A47L 9/2889; A47L 9/2805; A47L 9/00; A47L 9/28; A47L 9/2831; A47L 9/2868; A47L 5/00; H02J 7/0068; H02J 7/00
See application file for complete search history.

(56) References Cited

FOREIGN PATENT DOCUMENTS

| DE | 102010040336 | * | 3/2012 |
| DE | 10 2012 003 073 A1 | | 8/2013 |
| DE | 10 2012 003 076 A1 | | 8/2013 |
| DE | 10 2014 226 051 A1 | | 6/2016 |
| EP | 2080467 A2 | | 7/2009 |
| EP | 2 229 857 A2 | | 9/2010 |
| EP | 2 613 683 B1 | | 7/2013 |
| JP | H11-136191 A | | 5/1999 |

OTHER PUBLICATIONS

AVM, FRITZ!Powerline 546E, Company Brochure / Product Data Sheet 139914, 2014, AVM GmbH Berlin.

AVM, FRITZ!Powerline 546E, Manual, available at https://assets.avm.de/files/docs/fritzpowerline/fritzpowerline-546e/fritzpowerline-546e_man_en_GB.pdf (last visited Nov. 18, 2019) (provided to satisfy the requirements of 37 CFR 1.98 with respect to NPL #1 above).

AVM, FRITZ!Powerline 546E, Quick Guide, available at https://assets.avm.de/files/docs/fritzpowerline/fritzpowerline-546e/fritzpowerline-546e_qig_en_GB.pdf (last visited Nov. 18, 2019) (provided to satisfy the requirements of 37 CFR 1.98 with respect to NPL #1 above).

* cited by examiner

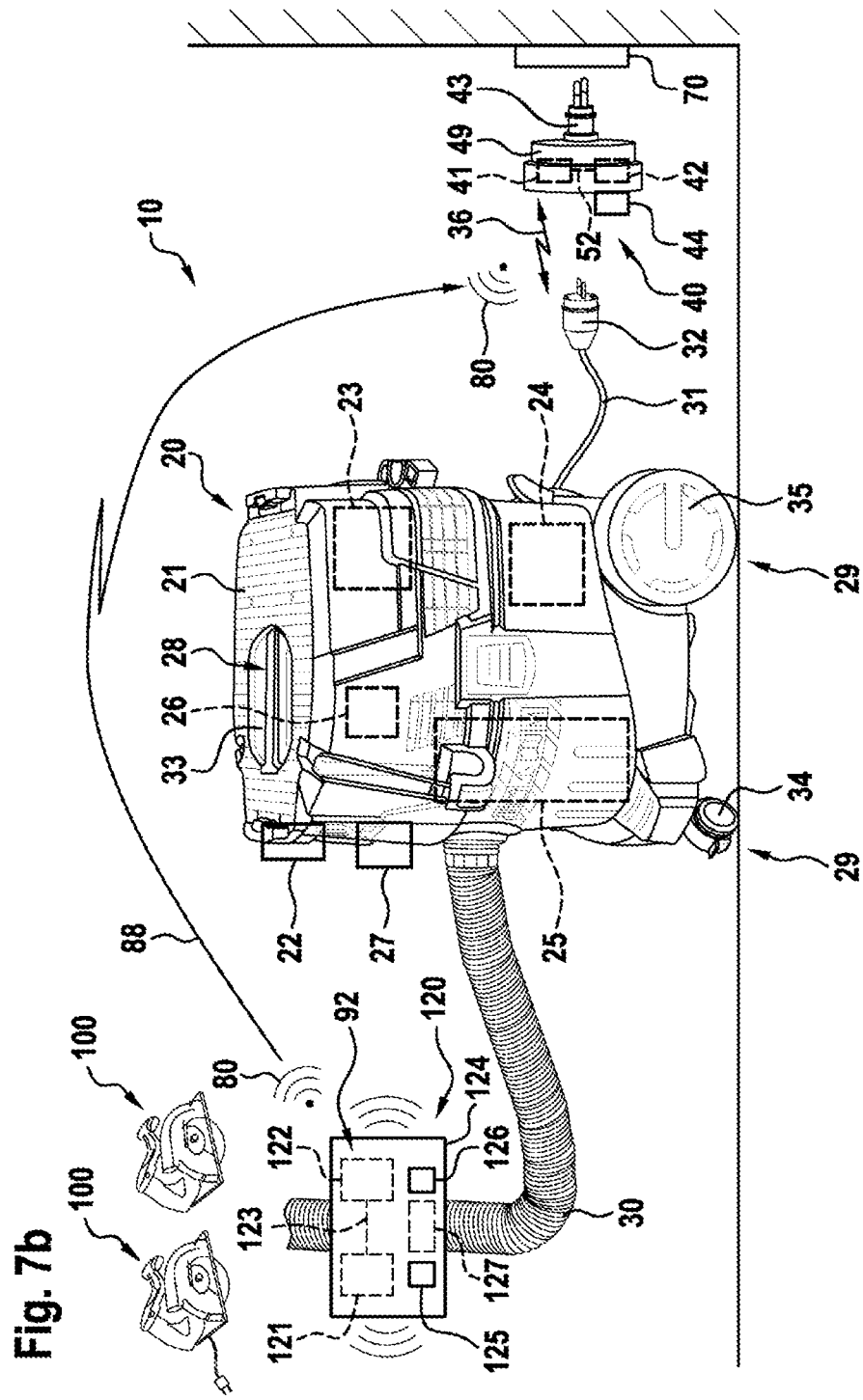

VACUUM APPARATUS HAVING A PLUG-IN MODULE

This application is a 35 U.S.C. § 371 National Stage Application of PCT/EP2018/052362, filed on Jan. 31, 2018, which claims the benefit of priority to Serial No. DE 10 2017 205 072.1, filed on Mar. 27, 2017 in Germany, the disclosures of which are incorporated herein by reference in their entirety.

The present disclosure relates to a vacuum device having a vacuum device housing, having at least one vacuum device network socket, and having a plug-in module.

BACKGROUND

A vacuum device having a vacuum housing, having a vacuum motor, and having a socket is already known from DE 10 2012 003 073 A1. The vacuum housing comprises the vacuum motor and also a dust collection chamber. The vacuum motor is provided for generating a vacuum flow and the dust collection chamber is provided for collecting separated particles from the vacuum flow. For this purpose, the vacuum device suctions in particles via a vacuum hose on the vacuum housing. The vacuum device is supplied with electrical energy by an electrical energy accumulator. The electrical energy can be provided by a rechargeable battery, but also by network operation, for example by a 230 V network. A network cable of a handheld power tool can be connected to the socket on the vacuum device, to supply the handheld power tool with electrical energy. As soon as the handheld power tool is supplied with electrical energy and a current flows via the socket, the vacuum motor of the vacuum device switches on automatically. To also enable automatic switching on of the vacuum motor for a battery-operated handheld power tool, the vacuum device furthermore comprises a vacuum device communication unit and also an external communication unit. A wireless control signal and/or report signal can be transmitted and received with the aid of the vacuum device communication unit and the external communication unit.

SUMMARY

The present disclosure is directed to a system comprising a vacuum device having a vacuum device housing and having at least one vacuum device network socket, wherein the at least one vacuum device network socket is attached to the vacuum device housing. It is proposed that the system moreover comprises a plug-in module having a plug-in module communication unit, having an electrical plug-in module network plug unit, and having a current control unit. The current control unit is designed to control an electric current between the plug-in module and the vacuum device.

The disclosure enables, because of the electrical plug-in module network plug unit, a universal use of the plug-in module for communication of the vacuum device with an external unit, in particular a power tool. The plug-in module can thus be used as a universal plug-in module. In contrast to the prior art, the present disclosure provides the solution to the problem of enabling a communication with the power tool for the vacuum device retroactively, via the universal plug-in module. In the scope of the present disclosure, "universal" means that the plug-in module establishes the communication with the power tool independently of a vacuum device producer and independently of a specific vacuum device type or vacuum device generation. The plug-in module is thus compatible and usable for essentially any vacuum device. The plug-in module can be plugged with the aid of the electrical plug-in module network plug unit, for example, into a vacuum device network socket provided in any case on the vacuum device. The prior art solely provides a possibility for communication with a handheld power tool via the separate and special external communication unit. This separate and special external communication unit is dependent on the vacuum device producer and is not usable for other vacuum devices.

The vacuum device comprises at least one vacuum device network socket. The vacuum device network socket is a network socket of the vacuum device.

In the scope of the present disclosure, a network socket comprises at least one electrical network plug receptacle having at least two electrical network plug receptacle elements. Network sockets are well known to a person skilled in the art. Examples of the at least one electrical network plug receptacle are network plug receptacle types A to O having two or three electrical network plug receptacle elements. A European plug receptacle and a Schuko plug receptacle are two examples of at least one electrical network plug receptacle having two electrical network plug receptacle elements. Moreover, network plug receptacle types according to the IEC 60309 standard for a three-phase alternating current are possible, such as a CEE plug receptacle device or a CeKon plug coupling. The CEE plug receptacle device and the CeKon plug coupling are examples of the electrical network plug receptacle having five electrical network plug receptacle elements.

The system furthermore also comprises the plug-in module having the plug-in module communication unit and having the current control unit. Moreover, the plug-in module comprises a plug-in module housing. The plug-in module housing comprises in particular the plug-in module communication unit and also the current control unit. In an alternative embodiment, it is also conceivable that the plug-in module communication unit and also the current control unit are arranged in two separate plug-in module housings.

The plug-in module communication unit is a communication unit of the plug-in module. In the scope of the present disclosure, a communication unit is designed for the purpose of transmitting and/or receiving communication signals. The communication signals can be transmitted in a wired manner, via a wire connection, or via conductor tracks on a circuit board, and/or the communication signals may be transmitted wirelessly. A wireless transmission of the communication signals can in this case be in the form of Bluetooth, WLAN, near-field communication by means of RFID technology, and also further wireless transmissions of the communication signals routine to a person skilled in the art. Communication protocols used in this case can be Bluetooth Smart, ANT, ZigBee, LoRa, SigFox, NB-IoT, BLE, IrDA, and also further communication protocols routine to a person skilled in the art.

The electrical plug-in module network plug unit is attached to the plug-in module. The electrical plug-in module network plug unit is a network plug unit of the plug-in module. The electrical plug-in module network plug unit comprises at least two electrical plug-in module network plug elements.

In the scope of the present disclosure, an electrical network plug unit comprises at least two electrical network plug elements. Electrical network plug units are well known to a person skilled in the art. Examples of the electrical network plug unit are network plug types A to O having two or three electrical network plug elements. A European plug and a Schuko plug are two examples of the electrical network plug unit having two electrical network plug elements. Moreover, network plug types according to the IEC 60309 standard for a three-phase alternating current are possible, such as a CEE plug device or a CeKon plug. The CEE plug device and the CeKon plug are examples of the electrical network plug unit having five electrical network plug elements. The electrical network plug unit is compatible in particular with the network socket.

The plug-in module comprises a current control unit, which is designed to control an electric current between the plug-in module and the vacuum device. For this purpose, the current control unit has a wired connection to the electrical plug-in module network plug unit.

The plug-in module communication unit is preferably designed to receive a first signal, in particular a communication signal, from at least one external communication unit. The first signal is a wireless signal in this case, but can also be a wired signal. The at least one external communication unit is a communication unit of the type mentioned at the outset. The designation "external" refers in the scope of the present disclosure to a communication unit separate from the plug-in module communication unit, which is located outside the plug-in module housing, for example. External communication units can be in this case a power tool communication unit, a sensor module communication unit, or a communication unit of an external communication device. External communication devices are, for example, a smart phone, a tablet, a PC, and also further external communication devices with communication unit known to a person skilled in the art.

Furthermore, the plug-in module communication unit can additionally be designed to transmit communication signals to an external communication unit. In this case, an item of information can be transmitted from the plug-in module communication unit, for example, to an external communication device.

The plug-in module communication unit receives in particular the first signal from at least one external communication unit of a power tool. The first signal contains in particular an item of information about an operating state of the power tool. The operating state is in particular a switched-on state and/or a switched-off state of the power tool. In this manner, the plug-in module communication unit receives an item of information about the operating state of the power tool.

In one advantageous embodiment, the plug-in module communication unit is provided to convert the first signal into a second signal, in particular an electrical signal. The first signal is processed in this case within the plug-in module communication unit, for example by means of a microprocessor and/or a microcontroller, and the information about the operating state of the power tool is converted into the second signal, i.e., the electrical signal, so that it can be further processed.

In a preferred manner, the plug-in module communication unit is designed to relay the second signal in a wired manner to the current control unit. A wired relay of the second signal can take place in a wired manner in this case if the plug-in module communication unit and the current control unit are arranged on different circuit boards. The wired relay of the second signal can also take place via conductor tracks if the plug-in module communication unit and the current control unit are arranged on one circuit board.

According to the disclosure, the current control unit is designed to control an electric current between the plug-in module and the vacuum device. The current control unit allows a current to flow in this case between the at least two network plug elements of the plug-in module. The plug-in module thus simulates an electrical consumer. For example, the vacuum device can comprise an autostart function, which enables independent starting of a vacuum device drive as soon as a load-dependent current is present at the vacuum device network socket. The plug-in module simulates the load-dependent current in this case, whereby the vacuum device drive is started independently. The functionality of the autostart function in vacuum devices, in particular upon use of a network-operated electrical power tool, is sufficiently known to a person skilled in the art, because of which it will not be described in greater detail here.

The vacuum device comprises, in a manner known per se, in particular a vacuum device drive, a vacuum device power supply, a dust collection device, and a vacuum device controller. The details and the effect of the vacuum device drive, the vacuum device power supply, the dust collection device, and the vacuum device controller are sufficiently known to a person skilled in the art.

The vacuum device is preferably a network-operated vacuum device, which is connectable by means of a power supply cable to an external network socket. In this case, the external network socket can provide a voltage of, for example, 100 V, 110 V, 120 V, 127 V, 220 V, 230 V, or 240 V at 50 Hz or 60 Hz, but also a three-phase AC voltage. The possible designs of the external network socket and the available voltages connected thereto are well known to a person skilled in the art. However, a battery-operated vacuum device is also conceivable, which is operable by means of a battery.

The vacuum device housing comprises the at least one vacuum device network socket. Furthermore, the vacuum device housing can comprise at least one vacuum device operating unit, at least one vacuum device holding unit, and at least one vacuum hose.

The at least one vacuum device network socket is at least one network socket of the vacuum device and is arranged on the vacuum device housing. The at least one network socket of the vacuum device is provided to supply a connected electrical device with power when the vacuum device itself is supplied with power. As described above, the at least one vacuum device network socket is the at least one network socket of the vacuum device, i.e., a network socket.

The vacuum device operating unit comprises at least one vacuum device operating element, which is designed to be operated by a user and to generate switching signals. The switching signals then control the vacuum device drive. The at least one vacuum device operating element can be arranged on one side of the vacuum device housing. Vacuum device operating elements can be, for example, a main switch or a setting switch. The main switch is provided for the purpose of switching the vacuum device drive on and off. The setting switch is designed for the purpose of setting a suction power of the vacuum device. The at least one vacuum device operating element is an operating element of the vacuum device.

An operating element can be designed as at least one push lever element, as at least one slide element, as at least one rotary element, or, however, as at least one tilt element. Further embodiments of the at least one operating element are also conceivable. The at least one push lever element is designed to be pressed by a user. The at least one slide element is provided to be displaced by a user. The at least one rotary element is designed to be rotated by a user. The at least one tilt element is provided to be tilted by a user. A combination of the mentioned operating elements is also possible depending on the embodiment.

The vacuum device holding unit comprises at least one vacuum device holding element, for example a vacuum device handle, using which the user can hold the vacuum device. The at least one vacuum hose is expediently detachably connectable to the vacuum device, wherein a nondetachable connection of vacuum hose and vacuum device is conceivable.

Moreover, at least one vacuum device movement unit can be attached to the vacuum device housing, so that the vacuum device is expediently a mobile vacuum device. The at least one vacuum device movement unit is preferably designed at least as one roller, at least as one wheel or the like, so that it can be moved on an underlying surface. Moreover, the mobile vacuum device can be designed as a portable vacuum device, which comprises rollers, wheels, or the like, or, however, does not have rollers, wheels, or the like. In the scope of the present disclosure, the user can carry along the vacuum device and use it directly at a desired usage location.

The details and the effect of the at least one vacuum device network socket, the vacuum device operating unit, the vacuum device holding unit, the vacuum hose, and the vacuum device movement unit are sufficiently known to a person skilled in the art.

In a first embodiment of the disclosure, the plug-in module is detachably connectable to the at least one vacuum device network socket. For this purpose, the plug-in module is connected via the electrical plug-in module network plug unit to the vacuum device network socket. In this case, the electrical plug-in module network plug unit is designed having its at least two electrical plug-in module network plug elements matching, in particular compatible, with the at least one vacuum device network socket. Upon connection of the plug-in module network plug unit to the vacuum device network socket, an electrical connection is established between the plug-in module and the at least one vacuum device network socket, whereby an electric current can flow between plug-in module and vacuum device.

In the scope of this disclosure, the term "matching", in particular compatible, means that two components or elements are adapted to one another, so that they can form a mechanical and/or electrical connection to one another.

In this first embodiment of the disclosure, the current control unit advantageously comprises a signal control unit and an electric load, wherein the signal control unit is provided to receive the second signal. The signal control unit and also the electric load can be connected in a wired manner on two different circuit boards, and also can be arranged on one circuit board. The signal control unit is particularly preferably designed as a microcontroller, which is provided to receive and control the electrical signals from the plug-in module communication unit. The control takes place in this embodiment at the electric load. The electric load can be an ohmic load, an inductive load, or also a capacitive load, or further electric loads known to a person skilled in the art.

The signal control unit is preferably designed to switch the second signal to the electric load, and the electric load is provided to receive the second signal and convert it into a third signal, wherein the electric load relays the third signal to the electric plug-in module network plug unit. As described above, the signal control unit is provided to switch the second signal. In this embodiment, the signal control unit switches the second signal to the electric load. The electric load, for example designed as an ohmic, inductive, and/or capacitive load, then converts the second signal into a third signal. This third signal is relayed to the electrical plug-in module network plug unit, so that the electric current flows between plug-in module and vacuum device.

In one embodiment, in which the vacuum device comprises an autostart function, the plug-in module plugged into the vacuum device network socket can thus simulate an electrical consumer. In this manner, in the case of battery-operated power tools, the plug-in module replaces the electrical connection between power tool and vacuum device, as exists in the case of network power tools via the power supply cable.

In a second embodiment of the disclosure, the plug-in module moreover comprises at least one plug-in module network socket and the current control unit additionally comprises a switching unit. The at least one plug-in module network socket is provided on the plug-in module housing, in particular on a different side of the plug-in module housing than the electrical plug-in module network plug unit. The at least one plug-in module network socket is at least one network socket of the plug-in module. The at least one network socket of the plug-in module is a network socket of the type mentioned at the outset. The at least one plug-in module network socket is designed as matching, in particular compatible, with the electrical plug-in module network plug unit. Examples of a matching design of the at least one plug-in module network socket and the electrical plug-in module network plug unit are a European plug and a European plug receptacle or a Schuko plug and a Schuko plug receptacle, but also further options familiar to a person skilled in the art for the matching design of plug-in module network plug unit and plug-in module network socket. In this second embodiment, the plug-in module is detachably connectable to an external network socket and a power supply cable of the vacuum device is detachably connectable to the plug-in module network socket. The external network socket can be a wall network socket in this case, and also a distributor network socket, or also a network socket fitting of an extension cable and further external network sockets known to a person skilled in the art. The external network socket is a network socket of the type mentioned at the outset.

In another embodiment, it is also conceivable that the plug-in module housing comprises more than one plug-in module network socket.

The power supply cable of the vacuum device comprises an electrical vacuum device network plug unit. The electrical vacuum device network plug unit is an electrical network plug unit of the vacuum device. As described above, the electrical network plug unit of the vacuum device is an electrical network plug unit of the type mentioned at the outset. The power supply cable of the vacuum device is designed in such a way that it is matching with the plug-in module network socket and is detachably connectable thereto. The plug-in module comprises in this case a matching electrical plug-in module network plug unit for the external network socket and a matching plug-in module network socket for the power supply cable of the vacuum device.

In this second embodiment, the signal control unit is advantageously additionally designed for the purpose of switching the second signal to the switching unit when the power supply cable of the vacuum device is connected to the plug-in module network socket and the plug-in module is connected to the external network socket. The signal control unit and the switching unit are connected in a wired manner. They can be arranged on one circuit board, so that the second signal is switched via conductor tracks, and also on two circuit boards having a wired connection to a wired circuit.

The signal control unit detects when the plug-in module is plugged into the external network socket. Moreover, the signal control unit detects when the power supply cable of the vacuum device is plugged into the plug-in module network socket. The signal control unit is also designed in this case to measure an impedance in order to detect a connected vacuum device. In addition, the impedance measurement is provided to enable an error analysis. Signal control unit, electric load, and switching unit are thus connected to one another in a wired manner.

Furthermore, in this second embodiment, the switching unit is preferably designed to receive the second signal and to switch a wired connection between the at least one plug-in module network socket and the electrical plug-in module network plug unit. The switching unit switches the wired connection between the at least one plug-in module network socket and the electrical plug-in module network plug unit as soon as it receives the second signal from the signal control unit. If the switching unit switches, the electric current flows between plug-in module and vacuum device, so that the vacuum device is supplied with current.

This second embodiment is also suitable in particular for vacuum devices without autostart function. In this case, the plug-in module effectuates an autostart function of the vacuum device by the vacuum device starting as soon as the plug-in module receives the first signal.

In an alternative embodiment of the second embodiment, the plug-in module is designed like an extension cable. In this case, the electrical plug-in module network plug unit is not attached directly to the plug-in module housing, but rather has a cable extension. The cable extension, which ends in the electrical plug-in module network plug unit, is arranged on the plug-in module housing. The plug-in module housing can comprise a further cable extension for the plug-in module network socket. Due to the further cable extension, the electrical plug-in module network plug unit and the plug-in module network socket have a greater distance than in the second embodiment, in which the plug-in module network socket and the electrical plug-in module network plug unit are arranged directly on the plug-in module housing.

In one advantageous design, the plug-in module comprises at least one plug-in module display element. The plug-in module display element is arranged on one side of the plug-in module housing. The plug-in module display element is used, for example, for displaying a number of operating states of the plug-in module. Examples of operating states of the plug-in module are: switched on and/or operative, switched off and/or inoperative, coupling procedure between plug-in module communication unit and external communication unit, coupling procedure completed, and further operating states known to a person skilled in the art.

Examples of the at least one plug-in module display element are an LED and also a display screen. It is also conceivable that the plug-in module comprises further plug-in module display elements.

The plug-in module advantageously comprises at least one plug-in module operating element. The at least one plug-in module operating element is arranged on one side of the plug-in module housing. The plug-in module operating element is provided so that a user can operate the plug-in module by means of the plug-in module operating element. The plug-in module operating element is an operating element of the plug-in module, i.e., an operating element of the type mentioned at the outset.

The system preferably additionally comprises a power tool, in particular a handheld power tool and/or a stationary power tool, having a power tool communication unit, wherein the plug-in module communication unit is designed to establish a communication connection to the power tool communication unit. The power tool can be a network-operated power tool, a battery-operated power tool, or also a pneumatic power tool in this case. Moreover, the power tool can also be operated via further options known to a person skilled in the art. Handheld power tools are also sufficiently known to a person skilled in the art, because of which they will not be described in greater detail here. In the scope of this disclosure, "stationary power tool" means a power tool which cannot be moved by a user without further aids because of its size, its weight, and/or its scale. One example of a stationary power tool is a circular table saw. Further examples of stationary power tools are sufficiently known to a person skilled in the art. The power tool communication unit is a communication unit of the power tool, i.e., a communication unit of the type mentioned at the outset. In order that the plug-in module communication unit and the power tool communication unit can establish the communication connection, the two communication units have to carry out a coupling procedure or a pairing. In the scope of this disclosure, the coupling procedure, also called "pairing", means that two communication units establish a wireless connection to one another, register and/or recognize one another, and subsequently communicate with one another. The pairing can be, for example, via a first or second communication path here. In the first communication path, the pairing takes place via a Bluetooth connection, wherein after successful coupling, a further communication also takes place via the Bluetooth connection. In the second communication path, the pairing takes place via a near-field communication (NFC), in which the power tool and the plug-in module are brought into the immediate vicinity of one another. The power tool and the plug-in module thus couple, wherein a subsequent communication then takes place via a Bluetooth connection. The sequence of the coupling procedure, and also the pairing, as well as the pairing via the first or second communication path between two communication units, is sufficiently known to a person skilled in the art, because of which it will not be described in greater detail here.

The plug-in module communication unit is advantageously provided to establish a direct communication connection to the power tool communication unit. In the scope of this disclosure, "direct communication connection" means a direct information and signal exchange between the plug-in module communication unit and the power tool communication unit, without a further communication unit, which participates in the direct signal exchange. Transmitting and receiving communication signals takes place wirelessly and directly between power tool and plug-in module, via the associated communication units. In an alternative embodiment, in the direct communication connection, the communication signals can also be exchanged in a wired manner.

The plug-in module communication unit is expediently additionally or alternatively designed to establish an indirect communication connection to the power tool communication unit by means of an external communication device. The indirect communication connection takes place in this case via the external communication device. As described above, examples of external communication devices are the smart phone, the tablet, the PC, and further communication devices known to a person skilled in the art. The external communication device has an app, a routine, and/or a program in this case to process the communication signals.

The communication signals between power tool communication unit and plug-in module communication unit always take place here via a communication unit of the external communication device. When the power tool communication unit transmits the communication signal, it is received by the communication unit of the external communication device and subsequently transmitted to the plug-in module communication unit. In this case, it is conceivable that operating states of the power tool are displayed on the external communication device by means of the app, the routine, and/or the program. Moreover, it is possible that the plug-in module transmits an operating state of the vacuum device to the external communication device and the external communication device displays this operating state of the vacuum device. The functionality and the use of the app, the routine, and/or the program for the external communication device for processing the communication signals is well known to a person skilled in the art.

In one preferred embodiment, the system moreover comprises a sensor module having a sensor module communication unit and having a sensor unit. The sensor module comprises a sensor module housing. The sensor module housing comprises the sensor module communication unit and also the sensor unit. The sensor module communication unit is a communication unit of the sensor module, i.e., a communication unit of the type mentioned at the outset. A power supply of the sensor module can be performed via a replaceable battery, but also via a rechargeable battery or by means of energy harvesting. The principle of energy harvesting is sufficiently known to a person skilled in the art. The sensor module is used in particular to detect and further process operating states of the power tool. The operating states of the power tool in this case are "active", i.e., put into operation by a user, and "inactive", taken out of operation by a user.

The sensor module can be arranged on the power tool or the vacuum hose. In a preferred manner, the sensor module is provided to establish a detachable connection to the power tool, in particular to a vacuum hose of the vacuum device. Moreover, the sensor module preferably comprises a sensor module holding device. The sensor module holding device is designed to detachably connect the sensor module to the power tool or the vacuum hose of the vacuum device. In the scope of the present disclosure, "detachable" means that the user can remove the sensor module directly from the power tool or the vacuum hose of the vacuum device without further aids. The detachable connection between the sensor module and the power tool or the vacuum hose of the vacuum device is achieved via the sensor module holding device. Examples of the sensor module holding device are a plug receptacle and/or a catch connection means and/or a hook-and-loop connection means and/or a screw connection means, with the object of holding the sensor module on the power tool or the vacuum hose. Further examples of the sensor module holding device are sufficiently known to a person skilled in the art, because of which they will not be described in greater detail here. It is also conceivable that the sensor module is an integral element of the power tool or the vacuum hose.

The sensor unit of the sensor module is particularly preferably designed to detect operating states of the power tool. The vacuum hose is furthermore connected to the power tool, wherein the sensor unit is provided to transmit the operating states in a wired manner to the sensor module communication unit, and the sensor module communication unit is designed to transmit the first signal to the plug-in module. The sensor unit is provided, for example, to detect the operating states of the power tool on the basis of its vibrations. In addition, the sensor unit is provided to differentiate whether the vibrations were generated by the user or by the power tool. For this purpose, the sensor unit comprises a sensor for detecting vibrations. Examples of such a sensor are: a location sensor, which detects a location of the sensor, a movement sensor, which detects a movement of the sensor, an acceleration sensor, which detects an acceleration of the sensor, an electrical sensor, such as a voltage sensor and/or a current sensor, which detects an electric current flow of the power tool, a speed sensor, which detects a speed of a drive motor of the power tool, or a magnetic sensor, which detects a magnetic field of the drive motor of the power tool. Moreover, the sensor unit is alternatively provided to detect the operating states of the power tool via further methods known to a person skilled in the art. The operating states of the power tool are, as described above, "active" and "inactive". The sensor unit detects these operating states when the sensor module is attached to the power tool or to the vacuum hose. These operating states of the power tool are detected by the sensor unit in the form of an item of analog information. The analog information is converted into an item of digital information by a suitable analysis algorithm for the sensor unit. It is conceivable that the sensor unit and/or the sensor module communication unit carries out a conversion of the analog information into the digital information by means of the suitable analysis algorithm.

The sensor unit and the sensor module communication unit are connected in a wired manner, wherein the sensor unit and the sensor module communication unit can be arranged on one circuit board, but also in a wired manner on two circuit boards. The sensor unit then transmits the digital information on the detected operating states of the power tool in a wired manner to the sensor module communication unit. The sensor module communication unit subsequently converts the operating state of the power tool into the first signal and transmits it to the plug-in module. The first signal transports an item of information about the power tool to the plug-in module.

The plug-in module communication unit is very particularly preferably provided to communicate wirelessly with the sensor communication unit. In order that the sensor module communication unit can communicate wirelessly with the plug-in module communication unit, the coupling procedure or the pairing has to take place between these two components. The coupling procedure between two communication units was already described above. Moreover, the coupling procedure is sufficiently known to a person skilled in the art, because of which it will not be described in greater detail here. After a successful coupling procedure, the sensor module communication unit can then wirelessly transmit the first signal to the plug-in module communication unit. In an alternative embodiment, the sensor module communication unit and the plug-in module communication unit can also be connected in a wired manner, whereby the first signal is then transmitted in a wired manner.

The sensor module advantageously comprises at least one sensor module display element. The sensor module housing comprises the sensor module display element. Moreover, the sensor module display element is designed to display operating states of the sensor module. The operating states of the sensor module can be in this case, for example, "switched on", "switched off", "automatic operating mode", "pairing", "connected", a battery charge state, or further operating states of the sensor module known to a person skilled in the art. Examples of sensor module display elements are at least one LED or at least one display screen.

In an advantageous manner, the sensor module comprises at least one sensor module operating element. The sensor module housing moreover comprises the at least one sensor module operating element. The at least one sensor module operating element is an operating element of the sensor module, i.e., an operating element of the type mentioned at the outset.

BRIEF DESCRIPTION OF THE DRAWINGS

The disclosure is explained hereafter on the basis of preferred embodiments. In the figures of the drawings hereafter.

DETAILED DESCRIPTION

Figure 1:
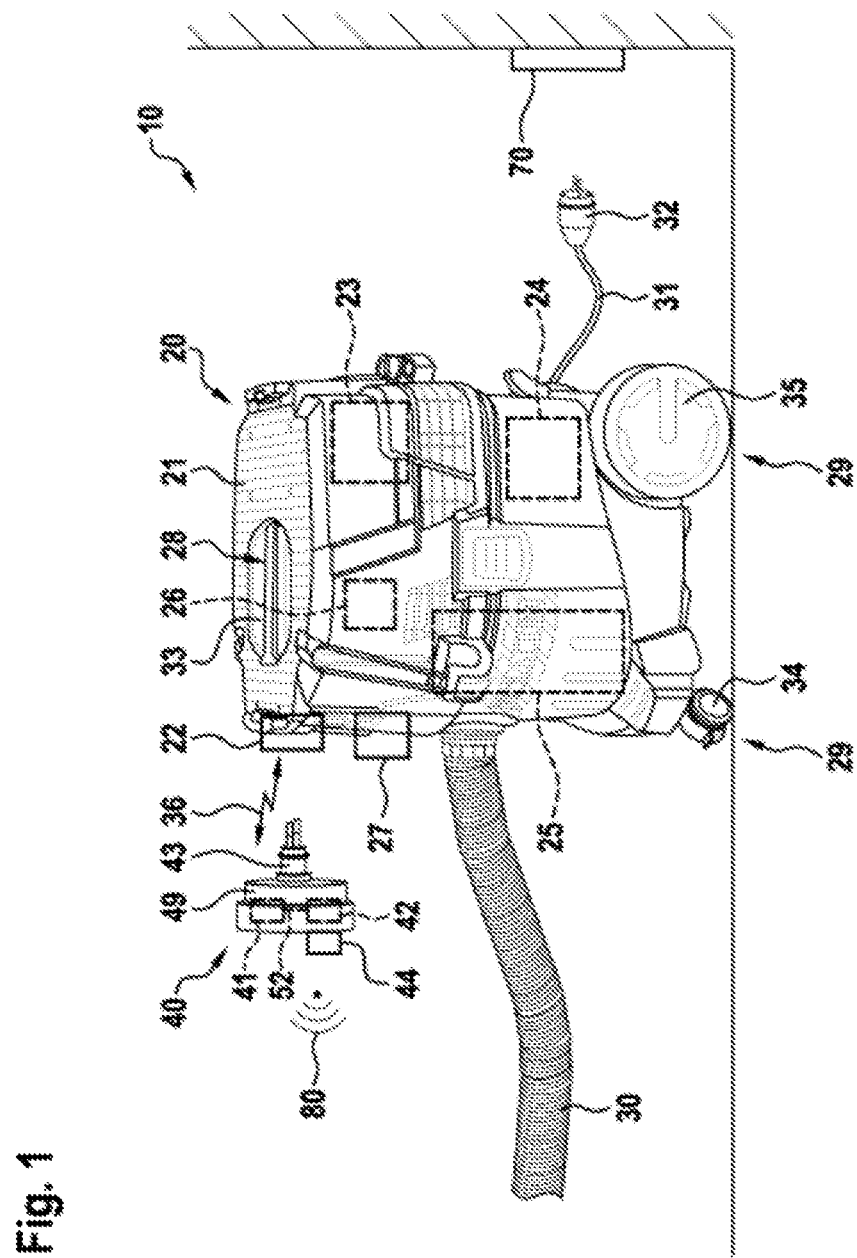
FIG. 1 shows a system according to the disclosure consisting of a vacuum device and a plug-in module in a schematic view in a first embodiment.

FIG. 1 shows a system 10 according to the disclosure, which comprises a vacuum device 20 having a vacuum device housing 21 and having a vacuum device network socket 22. In this case, the vacuum device network socket 22 is attached to the vacuum device housing 21. The vacuum device network socket 22 is designed in this embodiment as a Schuko plug receptacle. In other embodiments, further network plug receptacle types are also conceivable, as described above. The vacuum device network socket 22 can supply a connected electrical device with energy.

Moreover, the vacuum device 20 comprises a vacuum device drive 23, a vacuum device power supply 24, a dust collection device 25, and a vacuum device controller 26. The functionality and the interaction of the vacuum device drive 23, the vacuum device power supply 24, the dust collection device 25, and the vacuum device controller 26 are well known to a person skilled in the art.

In this embodiment, the vacuum device 20 is a network-operated vacuum device 20, which is connectable via a power supply cable 31 to an external network socket 70. The external network socket 70 provides a voltage of 230 V here. In other embodiments, the external network socket 70, as described above, can also provide other voltages. The power supply cable 31 comprises a network plug unit 32, which is designed in this embodiment as a Schuko plug.

The vacuum device housing 21 comprises a vacuum device operating unit 27, a vacuum device holding unit 28, and a vacuum hose 30. The vacuum device operating unit 27 is arranged in this embodiment on the same side of the vacuum device housing 21 as the vacuum device network socket 22 and the vacuum hose 30. Moreover, the vacuum device operating unit 27 is designed to be operated by a user and to generate switching signals. The vacuum device drive 23 is controlled by the switching signals.

In this embodiment, the vacuum device holding unit 28 comprises a vacuum device holding element, a vacuum device handle 33 here. The user can hold the vacuum device 20 at the vacuum device handle 33. The vacuum hose 30 is expediently detachably connectable to the vacuum device 20 in this embodiment. The vacuum hose 30 is located here on the same side of the vacuum device housing 21 as the vacuum device network socket 22 and also the vacuum device operating unit 27. In another embodiment, the vacuum hose 30 can also be permanently connected to the vacuum device 20.

A vacuum device movement unit 29 is attached to the vacuum device housing 21. In this embodiment, the vacuum device movement unit 29 consists of front guide rollers 34 and rear rollers 35. The front guide rollers 34 are used so that the user can steer the vacuum device 20 in a skilled manner to a required usage location. Because of the vacuum device handle 33, the user can moreover carry the vacuum device 20 to the required usage location.

The system 10 moreover comprises a plug-in module 40 having a plug-in module communication unit 41 and having a current control unit 42 and also an electrical plug-in module network plug unit 43. The plug-in module communication unit 41 is designed to receive and process a first signal 80. The first signal 80 is transmitted by an external communication unit 92, see FIG. 5, for example. The first signal 80 contains an item of information about an operating state of the power tool 100, as described at the outset. Examples of external communication units 92 are a power tool communication unit 101, a sensor module communication unit 122, and a communication unit 91 of an external communication device 90.

An electric current 36 between the plug-in module 40 and the vacuum device 20 is controlled by the current control unit 42.

In the embodiment of the plug-in module 40 according to FIG. 1, the plug-in module 40 can be detachably connected to the vacuum device network socket 22. For this purpose, the electrical plug-in module network plug unit 43 is designed as a Schuko plug, so that the plug-in module 40 is plugged into the Schuko plug receptacle of the vacuum device network socket 22. In this embodiment of the plug-in module 40, the electrical plug-in module network plug unit 43 has two electrical plug-in module network plug elements 48, see FIG. 3 in this regard. As soon as the plug-in module 40 is connected to the vacuum device network socket 22, the electric current 36 can in principle flow between plug-in module 40 and vacuum device 20.

Figure 2:
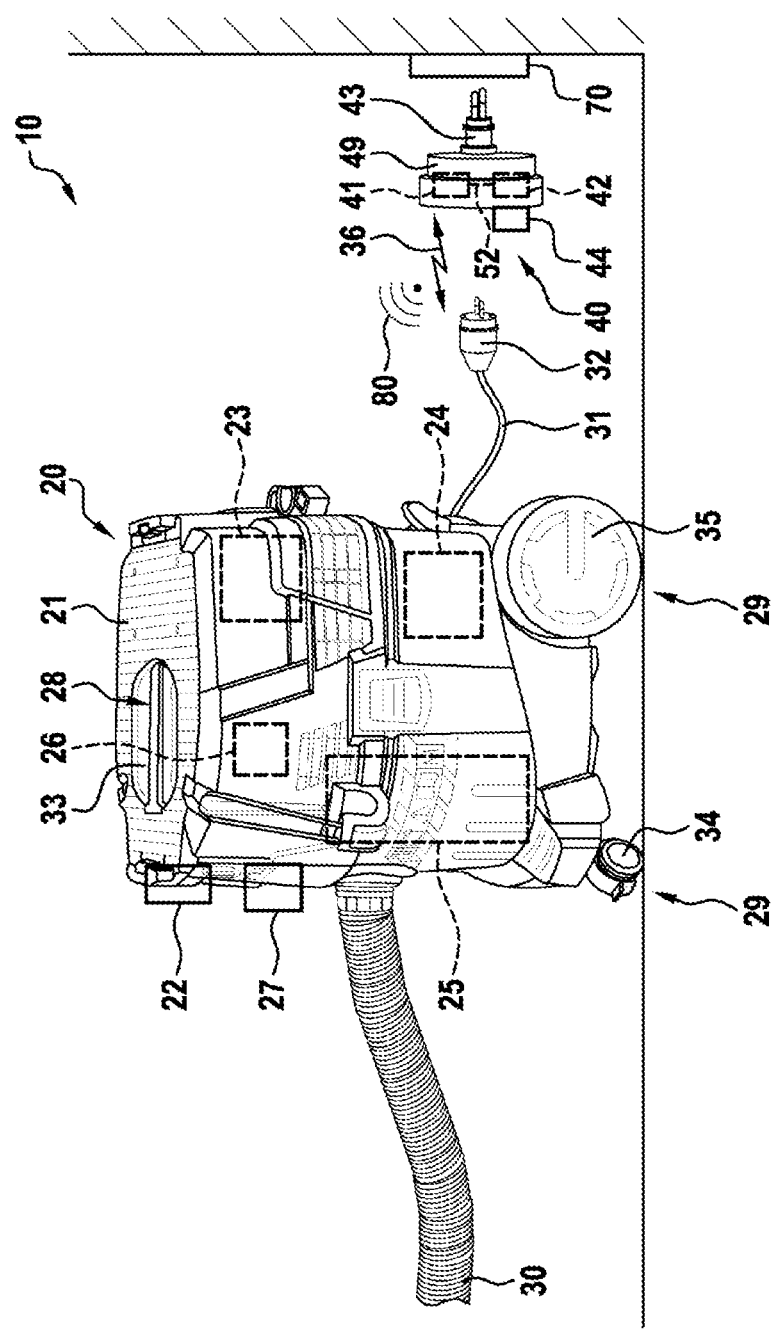
FIG. 2 shows a second embodiment of the system according to the disclosure in a schematic illustration.

A second embodiment of the plug-in module 40 is schematically illustrated in FIG. 2. The embodiment of the vacuum device 20 is according to FIG. 1. The difference of the second embodiment of the plug-in module 40 from the first embodiment of the plug-in module 40 is that the plug-in module 40 of the second embodiment additionally comprises a plug-in module network socket 44. The plug-in module network socket 44 is designed as a Schuko plug receptacle. Furthermore, the plug-in module network socket 44 is arranged on the plug-in module housing 49 and in the second embodiment of the plug-in module 40 is arranged on the opposite side to the electrical plug-in module network plug unit 43. The second embodiment of the plug-in module 40 comprises, like the first embodiment of the plug-in module 40, the plug-in module communication unit 41 and also the current control unit 42. In an alternative embodiment of the plug-in module 40, it is conceivable that further plug-in module network sockets 44 are arranged on the plug-in module housing 49. In the second embodiment of the plug-in module 40, the electrical plug-in module network plug unit 43 and the plug-in module network socket 44 are designed as a Schuko plug and a Schuko plug receptacle. In another embodiment, it is possible that the plug-in module housing 49 comprises more than one plug-in module network socket 44.

The plug-in module 40 of the second embodiment is detachably connectable to the external network socket 70 and is plugged in by the user. The power supply cable 31 of the vacuum device 20 is moreover detachably connectable to the plug-in module network socket 44. In this embodiment, the external network socket 70 is a wall network socket.

The user connects the vacuum device 20 via the power supply cable 31 of the vacuum device 20 to the plug-in module network socket 44 of the plug-in module 40. Moreover, the user connects the plug-in module 40 via the electrical plug-in module network plug unit 43 to the external network socket 70. The plug-in module 40 and also the vacuum device 20 are thus supplied with electrical energy and the electric current 36 can flow between vacuum device 20 and plug-in module 40. The electric current 36 flows between plug-in module 40 and vacuum device 20 as soon as the first signal 80 has been received and processed by the plug-in module 40.

Figure 3:
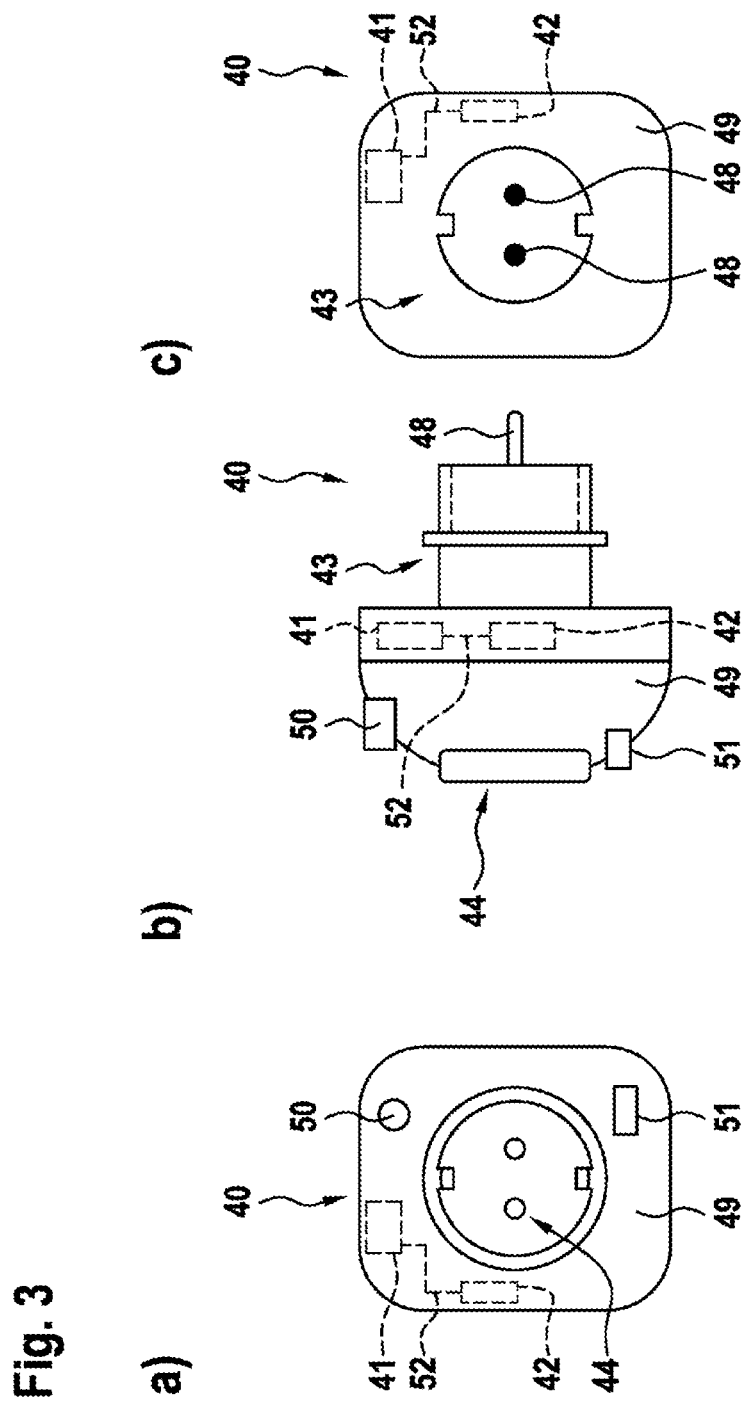
FIG. 3 shows an embodiment of the plug-in module in three views in a schematic illustration.

FIG. 3 shows a schematic illustration of the plug-in module 40 according to the disclosure in three views. The plug-in module 40 comprises the plug-in module housing 49. A schematic frontal view of the plug-in module 40 is indicated in FIG. 3a. The plug-in module housing 49 comprises the plug-in module network socket 44, which is designed as a Schuko plug receptacle, a display element 50 of the plug-in module 40, and an operating element 51 of the plug-in module 40.

The plug-in module housing 49 comprises the plug-in module communication unit 41 and the current control unit 42. The plug-in module communication unit 41 and the current control unit 42 are connected by means of a wired connection 52.

FIG. 3b shows a schematic side view of the plug-in module 40 having the electrical plug-in module network plug unit 43, designed as a Schuko plug, having two electrical plug-in module network plug elements 48. In this embodiment, the plug-in module network socket 44 and the electrical plug-in module network plug unit 43 are located on the plug-in module housing 49 on opposite sides. A schematic rear view having the electrical plug-in module network plug unit 43 of the plug-in module 40 is shown in FIG. 3c.

Figure 4:
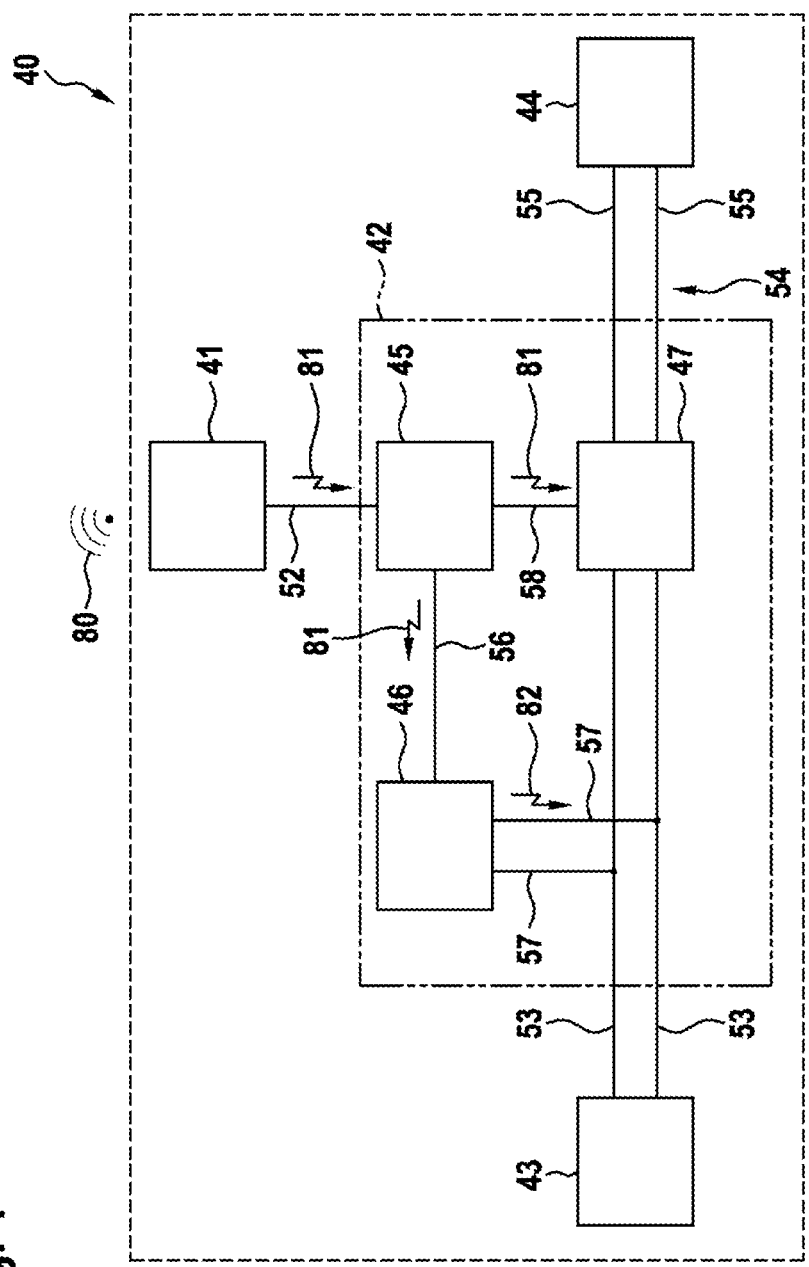
FIG. 4 shows a block diagram to explain the plug-in module from FIG. 3.

A schematic block diagram of the plug-in module 40 is illustrated in FIG. 4. The plug-in module communication unit 41 is connected via a wired connection 52 to the current control unit 42. The current control unit 42 is connected to the electrical plug-in module network plug unit 43 by means of a wired connection 53. Moreover, there is a wired connection 55 between plug-in module network socket 44 and the current control unit 42. There is thus a wired connection 54 from the plug-in module network socket 44 to the electrical plug-in module network plug unit 43. The current control unit 42 furthermore comprises a signal control unit 45 and an electric load 46. The signal control unit 45 and the electric load 46 form a wired connection 56. Moreover, the electric load 46 is connected by means of a wired connection 57 to the electrical plug-in module network plug unit 43. Furthermore, there is also a wired connection 58 between the signal control unit 45 and the switching unit 47. There is a wired connection 59 between the switching unit 47 and the electrical plug-in module network plug unit 43. The switching unit 47 establishes the wired connection 54 of the plug-in module network socket 44 and the electrical plug-in module network plug unit 43.

The plug-in module communication unit 41 receives the first signal 80 and converts it into a second signal 81. The first signal 80 is a wireless communication signal, but can also be wired in an alternative embodiment, and contains one of the two operating states of the power tool 100, "active" or "inactive", as described at the outset. The first signal 80 is converted into an electric signal, the second signal 81. The plug-in module communication unit 41 relays the second signal 81 via the wired connection 52 to the current control unit 42. The signal control unit 45 receives the second signal 81 in the current control unit 42. The signal control unit 45 switches the second signal 81 either to the electric load 46, via the wired connection 56, or to the switching unit 47, via the wired connection 58.

If the plug-in module 40 is connected to the vacuum device network socket 22, the signal control unit 45 switches the second signal 81 to the electric load 46. The electric load 46 receives the second signal 81 and converts it into a third signal 82. Subsequently, the electric load 46 relays the third signal 82 to the electrical plug-in module network plug unit 43 via the wired connection 57.

If the plug-in module 40 is connected to the external network socket 70 and the power supply cable 31 of the vacuum device 20 is connected to the plug-in module network socket 44, the signal control unit 45 switches the second signal 81 to the switching unit 47. The signal control unit 45 switches the second signal 81 via the wired connection 58 to the switching unit 47. When the switching unit 47 receives the second signal 81, it establishes the wired connection 54 between the plug-in module network socket 44 and the electrical plug-in module network plug unit 43.

If the first signal 80 contains the operating state "active" of the power tool 100, the electric current 36 is switched and the vacuum device drive 23 starts. If the first signal 80 contains the operating state "inactive" of the power tool 100, the electric current 36 is stopped and the vacuum device 20 is switched off (autostart function).

Figure 5:
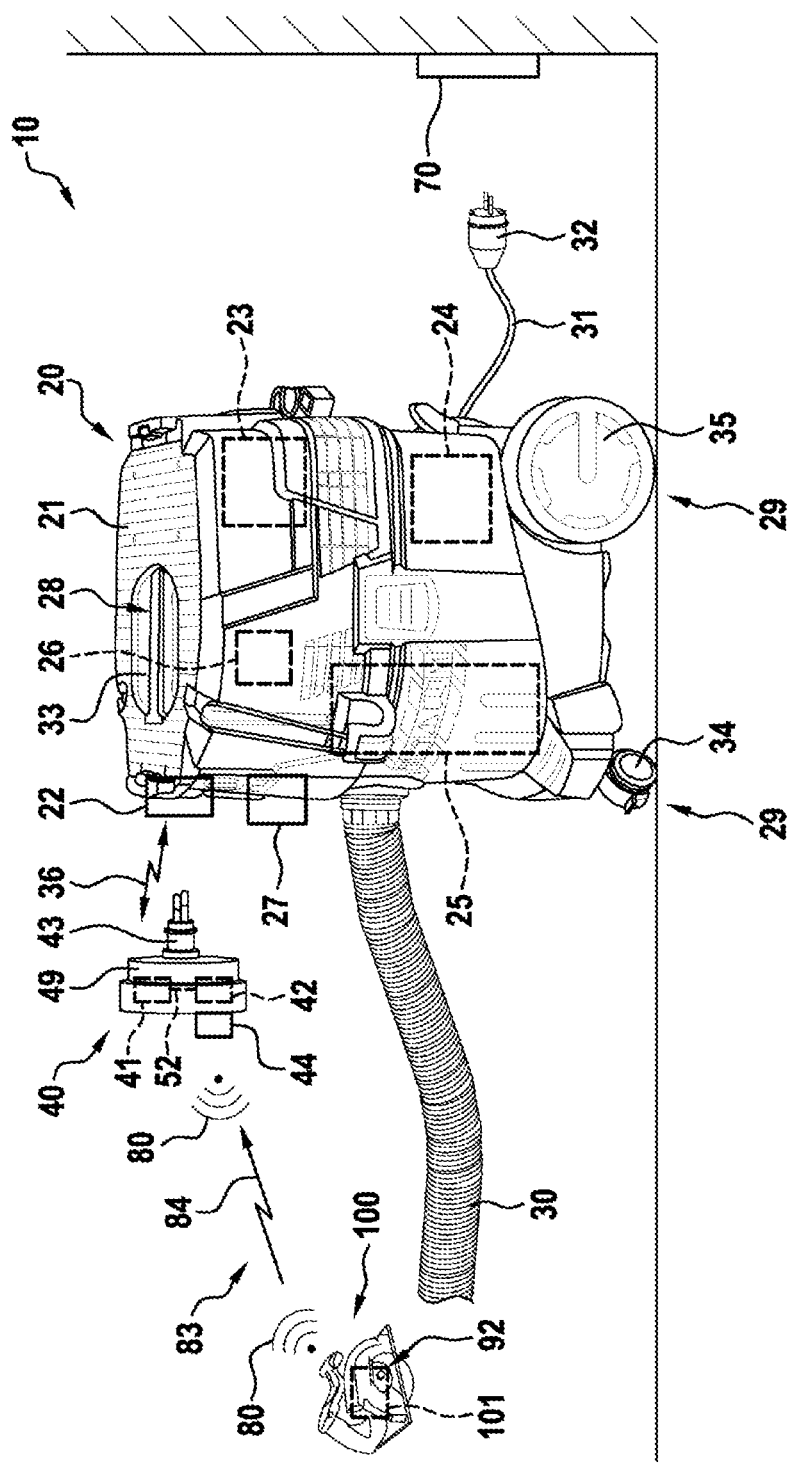
FIG. 5 shows a schematic illustration of the vacuum device having plug-in module and a power tool in a direct communication.

FIG. 5 shows a schematic embodiment according to FIG. 1, with the difference that the system 10 additionally comprises a power tool 100. In this embodiment, the power tool 100 is designed as a battery-operated handheld power tool, however, a network-operated handheld power tool or a stationary power tool is also conceivable. The power tool 100 is connected to the vacuum hose 30 of the vacuum device 20. The power tool 100 comprises a power tool communication unit 101. The plug-in module communication unit 41 forms a communication connection 83 to the power tool communication unit 101. In this embodiment, the communication connection 83 is a direct communication connection 84, in which a communication takes place directly from the power tool 100 to the plug-in module 40. The direct communication connection 84 is a wireless communication connection, in which an information exchange takes place directly between the power tool 100 and the plug-in module 40.

The plug-in module communication unit 41 and the power tool communication unit 101 establish the direct communication connection 84 after the two communication units have carried out a coupling procedure or a pairing. The coupling procedure is well known to a person skilled in the art. The direct communication connection 84 is a wireless communication connection, but can also be wired in an alternative embodiment. After the coupling procedure, the power tool communication unit 101 transmits the first signal 80 as soon as the power tool 100 is started or put into operation. The plug-in module communication unit 41 receives the first signal 80 and starts the electric current 36 and thus the vacuum device drive 23 (autostart function).

The direct communication connection 84 is also possible in the second embodiment of the plug-in module 40, cf. FIG. 2 in this regard. In the second embodiment of the plug-in module 40, the plug-in module 40 is connected to the external network socket 70. The power supply cable 31 of the vacuum device 20 is connected in this case to the plug-in module network socket 44. When the power tool communication unit 101 transmits the first signal 80, as soon as the power tool 100 starts, the plug-in module communication unit 41 receives the first signal 80 and controls the electric current 36. The power tool 100 is also connected to the vacuum hose 30 of the vacuum device 20 in this embodiment.

Figure 6:
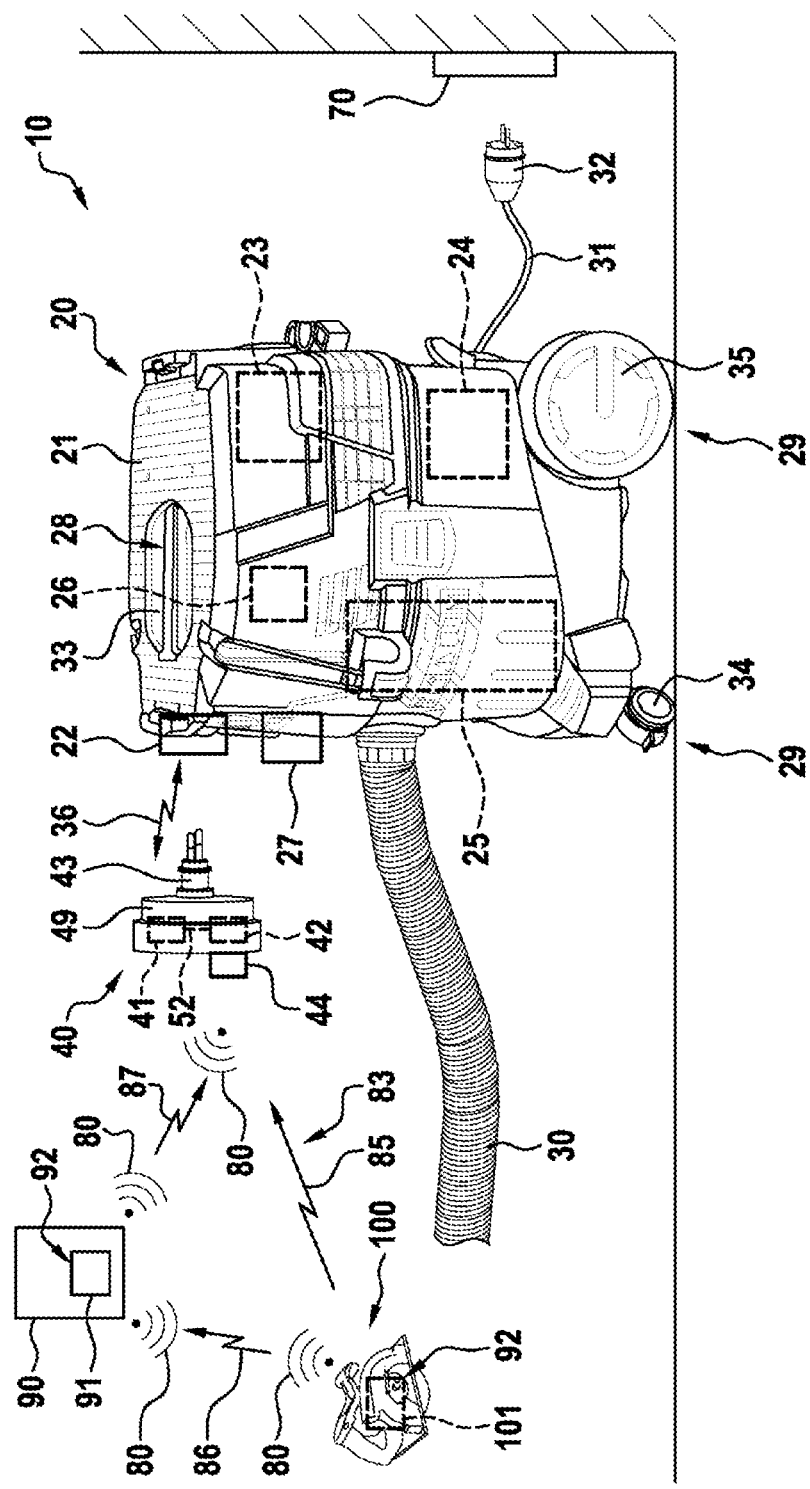
FIG. 6 shows a vacuum device having plug-in module and power tool, which are connected via an indirect communication connection, in a schematic illustration.

A communication connection alternative to FIG. 5, an indirect communication connection 85, will be explained on the basis of FIG. 6. The indirect communication connection 85 is a wireless communication connection, but can also be wired in an alternative embodiment. The system 10 additionally comprises an external communication device 90 having a communication unit 91 of the external communication device 90 here. The indirect communication connection 85 from power tool 100 to the plug-in module 40 is established in this case via the external communication device 90.

The power tool 100 is connected to the vacuum hose 30 of the vacuum device 20. As soon as the power tool 100 starts, the power tool communication unit 101 transmits the first signal 80 via a communication connection 86 to the communication unit 91 of the external communication device 90. The communication unit 91 of the external communication device 90 relays the first signal 80 via a communication connection 87 to the plug-in module communication unit 41. The plug-in module 40 then processes the first signal 80 and controls the electric current 36. Examples of external communication devices 90 are a smart phone, a tablet, a PC, and further communication devices known to a person skilled in the art.

The indirect communication connection 85 is also possible in the second embodiment of the plug-in module 40, cf. FIG. 2 in this regard. To achieve the indirect communication connection 85 in the second embodiment of the plug-in module 40, the plug-in module 40 is connected to the external network socket 70. The power supply cable 31 of the vacuum device 20 is subsequently connected to the plug-in module network socket 44. The power tool 100 is furthermore connected to the vacuum hose 30 of the vacuum device 20. A transmission of the communication signals takes place, as already described above, via the communication unit 91 of the external communication device 90. In this case, the difference from the above-described embodiment is solely the arrangement of vacuum device 20, plug-in module 40, and external network socket 70. The power tool 100 is also connected to the vacuum hose 30 of the vacuum device 20 in this embodiment.

Figure 7A:
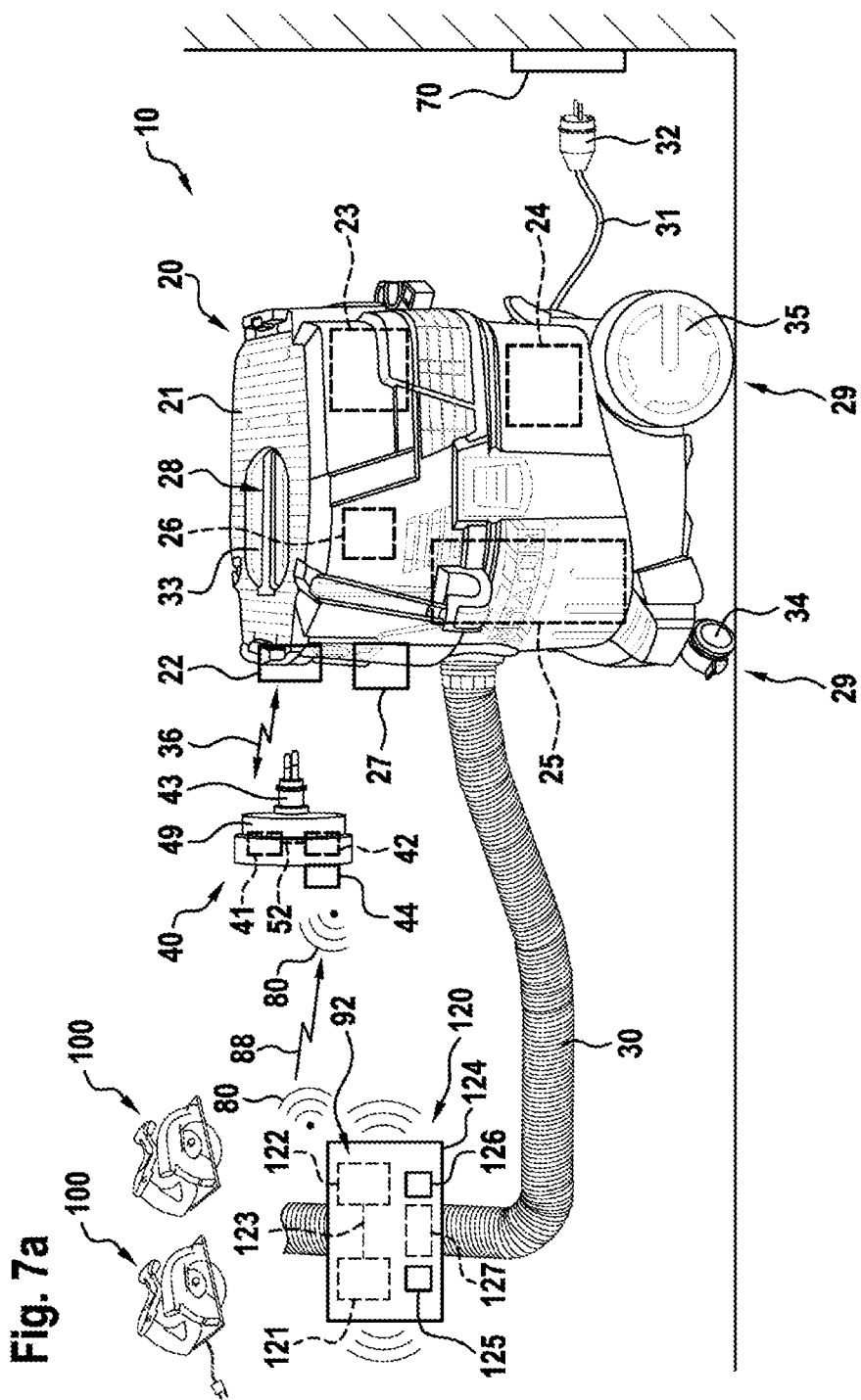
FIG. 7 shows two schematic illustrations of the system made of the vacuum device having the plug-in module and having a sensor module.

FIG. 7a shows a schematic embodiment according to FIG. 1, with the difference that the system 10 comprises a sensor module 120 here. The sensor module 120 is detachably fastened on the vacuum hose 30 of the vacuum device 20. The vacuum hose 30 is in turn connected to the power tool 100.

The sensor module 120 comprises a sensor module housing 124 and also a sensor unit 121, a sensor module communication unit 122, and a sensor module power supply 127. Moreover, the sensor module 120 comprises a sensor module display element 125. The sensor module display element 125 is arranged on the sensor module housing 124. The sensor module display element 125 displays operating states of the sensor module 120.

Furthermore, the sensor module 120 comprises a sensor module operating unit 126. The sensor module operating unit 126 is arranged on the sensor module housing 124. The user can, for example, switch the sensor module 120 on and/or off, or initiate a coupling procedure with the plug-in module 40, via the sensor module operating unit 126. The coupling procedure or the pairing is sufficiently known to a person skilled in the art.

The sensor unit 121 is designed to detect operating states of the power tool 100 when the vacuum hose 30 is connected to the power tool 100. The sensor unit 121 detects, for example, the operating states "active" and "inactive" of the power tool 100 via vibrations of the power tool 100. As soon as the sensor unit 121 has detected the operating state, it is transmitted via a wired connection 123 to the sensor module communication unit 122. The sensor module communication unit 122 is designed to detect this operating state and to generate the first signal 80 therefrom. Subsequently, the sensor module communication unit 122 transmits the first signal 80 via a communication connection 88 to the plug-in module 40. The communication connection 88 is wireless in this case, but can also be wired in an alternative embodiment. The plug-in module communication unit 41 is thus designed to communicate wirelessly with the sensor communication unit 122. To establish the communication connection 88 wirelessly between the sensor module communication unit 122 and the plug-in module communication unit 41, the coupling procedure or the pairing has to take place between these two components. This coupling procedure is sufficiently known to a person skilled in the art.

An alternative to the design according to FIG. 7a is illustrated in FIG. 7b, with the difference that the plug-in module 40 is connected here to the external network socket 70 and the power supply cable 31 of the vacuum device 20 is connected to the plug-in module network socket 44. The construction and the functionality of the sensor module 120 is indicated in FIG. 7a. The functionality of the plug-in module 40, when it is connected to the external network socket 70, is described in FIG. 2.

The invention claimed is:

1. A system comprising:
   a vacuum device having a housing, a vacuum drive device mounted on the housing, and a network socket attached to the housing, the vacuum device operably connected to an external network socket; and
   a plug-in module including a communication device, a network plug unit connected to the network socket of the vacuum device, and a current control device, the current control device configured to control an electric current supplied to the vacuum drive device from the external network socket based on a first signal received by the communication device,
   wherein the first signal is a wireless signal transmitted from a power tool, and
   wherein the first signal corresponds to an operating state of the power tool.

2. The system as claimed in claim 1, wherein:
the communication device of the plug-in module is configured to receive the first signal from at least one external communication device of the power tool, and
the first signal is a communication signal.

3. The system as claimed in claim 2, wherein:
the communication device of the plug-in module is configured to convert the first signal into a second signal, and
the second signal is an electric signal.

4. The system as claimed in claim 3, wherein the communication device of the plug-in module is configured to relay the second signal in a wired manner to the current control device.

5. The system as claimed in claim 3, wherein:
the current control device comprises a signal control device and an electric load, and
the signal control device is configured to receive the second signal.

6. The system as claimed in claim 5, wherein:
the plug-in module further includes at least one network socket,
the network plug unit of the plug-in module is detachably connectable to the external network socket, and
a power supply cable of the vacuum device is detachably connectable to the at least one network socket of the plug-in module.

7. The system as claimed in claim 6, wherein:
the current control device includes a switching device, and
the signal control device is configured to switch the second signal to the switching device in response to the power supply cable being connected to the network socket of the plug-in module and the network plug unit of the plug-in module being connected to the external network socket.

8. The system as claimed in claim 7, wherein the switching device is configured to receive the second signal and to switch a wired connection between the network socket of the plug-in module and the network plug unit of the plug-in module.

9. The system as claimed in claim 1, wherein the plug-in module is detachably connectable to (i) the network socket of the vacuum device, and (ii) the external network socket.

10. The system as claimed in claim 1 further comprising:
a power tool having a communication device, the power tool being one of a handheld power tool and a stationary power tool,
wherein the communication device of the plug-in module is configured to establish a communication connection with the communication device of the power tool to receive the first signal.

11. The system as claimed in claim 10, wherein the communication device of the plug-in module is configured to establish a direct communication connection with the communication device of the power tool.

12. The system as claimed in claim 10, wherein the communication device of the plug-in module is configured to establish an indirect communication connection with the communication device of the power tool via an external communication device that is spaced apart from the vacuum device, the power tool, and the plug-in module.

13. The system as claimed in claim 10 further comprising:
a sensor module having a communication device and a sensor.

14. The system as claimed in claim 13, wherein the sensor module is detachably connected to a vacuum hose of the vacuum device.

15. The system as claimed in claim 14, wherein:
the sensor is configured to detect operating states of the power tool;
the vacuum hose is connected to the power tool;
the sensor is configured to transmit the detected operating states in a wired manner to the communication device of the sensor module; and
the communication device of the sensor module is configured to transmit the first signal to the plug-in module.

16. A system, comprising:
a vacuum device having a housing, a vacuum drive device mounted on the housing, and at least one network socket mounted on the housing, the vacuum device operably connected to an external network socket; and
a plug-in module having a communication device, an electrical network plug unit connected to the at least one network socket, and a current control device configured to control an electric current supplied to the vacuum drive device from the external network socket,
wherein the communication device of the plug-in module is configured to receive a first signal from at least one external communication device of the power tool,
wherein the communication device of the plug-in module is configured to convert the first signal into a second signal that is an electric signal,
wherein the current control device comprises a signal control device and an electric load, the signal control device unit configured to receive the second signal,
wherein the signal control device is configured to switch the second signal to the electric load, and
wherein the electric load is configured to receive the second signal, convert the second signal into a third signal, and relay the third signal to the electrical network plug unit for supplying the electric current to the vacuum drive device.

17. A system comprising:
a vacuum device having a housing, a vacuum drive device mounted on the housing, a power supply cable operably connected to the vacuum drive device and including a first network plug unit, and a first network socket attached to the housing; and
a plug-in module including a communication device, a second network plug unit, a second network socket, and a current control device,
wherein when (i) the first network plug unit is received by an external network socket, and (ii) the second network plug is received by the first network socket, the current control device is configured to control an electric current supplied to the vacuum drive device from the external network socket based on a first signal received by the communication device from a power tool, and
wherein when (i) the first network plug unit is received by the second network socket, and (ii) the second network plug is received by the external network socket, the current control device is configured to control the electric current supplied to the vacuum drive device from the external network socket based on the first signal received by the communication device from the power tool.

* * * * *